(12) United States Patent
Bishop

(10) Patent No.: US 8,863,699 B2
(45) Date of Patent: Oct. 21, 2014

(54) DISPOSABLE, SINGLE-USE ANIMAL HAIR AND DANDER COVERING

(76) Inventor: Dianne Bishop, Montgomery, AL (US)

(*) Notice: Subject to any disclaimer, the term of this patent is extended or adjusted under 35 U.S.C. 154(b) by 0 days.

(21) Appl. No.: 13/413,774

(22) Filed: Mar. 7, 2012

(65) Prior Publication Data

US 2012/0227679 A1    Sep. 13, 2012

Related U.S. Application Data

(60) Provisional application No. 61/450,209, filed on Mar. 8, 2011.

(51) Int. Cl.
*A01K 13/00*    (2006.01)

(52) U.S. Cl.
CPC .................................. *A01K 13/006* (2013.01)
USPC .......................................................... 119/850

(58) Field of Classification Search
USPC ......... 119/850, 863, 854, 650, 651, 678, 600, 119/601, 602; 54/79.1
See application file for complete search history.

(56) References Cited

U.S. PATENT DOCUMENTS

| | | | | |
|---|---|---|---|---|
| 3,150,641 A | * | 9/1964 | Kesh .............................. | 119/678 |
| 3,742,679 A | * | 7/1973 | Jordan ........................... | 54/79.1 |
| 4,355,600 A | * | 10/1982 | Zielinski ....................... | 119/850 |
| D352,370 S | | 11/1994 | Shover | |
| 6,024,055 A | * | 2/2000 | Jesse et al. .................... | 119/850 |
| 6,058,890 A | * | 5/2000 | Harrell .......................... | 119/850 |
| 6,223,696 B1 | | 5/2001 | Murakami | |
| D444,923 S | | 7/2001 | Dzamon | |
| 6,481,383 B1 | | 11/2002 | Ross | |
| 6,584,939 B1 | | 7/2003 | Brezinski | |
| D615,252 S | * | 5/2010 | Nunes-Freitas et al. ..... | D30/145 |
| 7,793,619 B2 | | 9/2010 | Kajanoff | |
| 2007/0056530 A1 | * | 3/2007 | Nassour ........................ | 119/850 |
| 2008/0264351 A1 | * | 10/2008 | Williams ...................... | 119/850 |
| 2010/0115895 A1 | * | 5/2010 | Prill .............................. | 54/79.2 |
| 2010/0132631 A1 | * | 6/2010 | Walker-Algaze ............ | 119/850 |
| 2010/0199928 A1 | * | 8/2010 | Matsumoto et al. .......... | 119/850 |

* cited by examiner

*Primary Examiner* — Rob Swiatek
*Assistant Examiner* — Ebony Evans
(74) *Attorney, Agent, or Firm* — Daniel Boudwin; Global Intellectual Property Agency LLC

(57) ABSTRACT

A disposable pet garment adapted to trap loose hair and dander from the animal, whereafter the garment is readily disposable and replaceable. The garment comprises a body section providing coverage over a the pet's torso section, a plurality of sleeve projections that extend from the body section and along a majority of each leg, along with a removable line of attachment along the body section adapted to provide securement along the animal's back. The garment itself comprises a lightweight, disposable material that is provided in a form-fitting or loosely-fitted style that is easily deployed onto the pet and easily removed, wherein pet hair and dander is trapped within the garment and discarded after removal. A preferred embodiment utilizes a lightweight polypropylene material for construction, wherein a single formed sheet forms the body section and is sewn to the leg projections.

3 Claims, 4 Drawing Sheets

DISPOSABLE, SINGLE-USE ANIMAL HAIR AND DANDER COVERING

CROSS REFERENCE TO RELATED APPLICATION

This application claims the benefit of U.S. Provisional Application No. 61/450,209 filed on Mar. 8, 2011, entitled "Sheddin Jams/Bubble Jams."

BACKGROUND OF THE INVENTION

1. Field of the Invention

The present invention relates to animal covers and articles that prevent the spread of loose pet hair and dander in an indoor environment. More specifically, the present invention pertains to an easily deployable and readily disposable pet jacket or covering, which can be form-fitting or loosely applied to prevent loose hair from spreading onto indoor furniture and into the environment. The covers are not meant to be warm jackets or decorative covers, but rather are provided in a construction that readily allows for their disposal after a single use and for distributing the covers in a package having several disposable articles.

The spread of pet hair and dander within an indoor environment is a common for those homeowners with domesticated pets, including cats and dogs. Hair from these animals is easily displaced onto home furnishings, beds and even made airborne as the pet brushes against objects or moves from room to room. Dander, or pet dandruff, along with liberated hair from the pet can lead to several problems within the home, including increased allergies from owners and the spread of unsightly hair onto furniture and about a household, which can be a headache to clean up and constantly maintain as the animal sheds. The present invention is provided to counteract the constant shedding of domesticated dogs and cats within the household. The present invention provides a pet owner with a better portion than dealing with allergies or constantly cleaning household furniture and living spaces. Specifically, an easily deployable, easily removable and readily disposable pet covering is disclosed, wherein the pet is shrouded along a majority of its body to trap liberate hair particles and dander that would otherwise stick to furniture, bedding or become released into the environment.

Enthusiastic and loving pet owners generally allow their pets to freely roam their household, lie on furniture and even allow the pet to accompany them while sleeping. This can lead to the distribution of loose hair and odor throughout the house and on indoor furniture, which may be time consuming to consistently clean and keep free of pet hair. The present invention contemplates two key embodiments related to its construction and for the purposes of limiting the spreading of pet hair on objects within the household. A first embodiment is adapted to be form-fitting to the particular pet, wherein its structure is tailored to fit closely against the pet's body while deployed. A second embodiment contemplates a baggy, more loosely-fitted structure that is more comfortable and allows the pet to stretch and sleep with less restriction than a form-fitting cover. Both embodiments comprise a readily disposable material constructed with minimal panels and potential sewn lines of weakness along its body portion. Similarly, both embodiments are adapted to be easily fitted to an animal, wherein the pet can easily step into the cover whereafter it is secured therearound for complete hair coverage.

2. Description of the Prior Art

Similar pet coverings and garments have been disclosed in the prior art that relate to reducing loose hair and dander spreading, pet comfort, warmth and improved styling. These devices have familiar design elements for the purposes of providing a cover for a domesticated pet while indoors or outdoors, wherein a body structure and legs are provided for protection against elements or for the prevention of shed hair distribution. Devices in the prior art relate mostly to pet warmth while outdoors and in colder climates. Those related to pet hair and dander have a diverging construction and concept as it relates to a pet covering that traps loose hair. The present invention provides a readily disposable alternative to those present in the prior art. Those devices deemed most relevant to the present disclosure are presented herein.

Specifically, U.S. Pat. No. 6,584,939 to Brezinski discloses an animal coat and method of making the coat for providing insulation and protection of domesticated and undomesticated animals. The coat comprises a first and second lateral strap that passes under the animal and to engage one another over the animal's chest region. A further chest strap running fore-aft from the forward section of the coat provides overlapping engagement with the lateral straps to improve securement and ease of application and removal. The Brezinski device is an insulated coat for the purposes of providing warmth to an animal, wherein its structure is defined by an insulated and weather-shielding material adapted for continued use in colder climates. The present invention provides a readily disposable hair and dander shield that is adapted for single use, rather than that of the more expensive and heavily insulated variety of animal coats.

U.S. Pat. No. 6,481,383 to Ross is another device that discloses a garment for pets designed to minimize distribution of hair while maximizing pet comfort. The device comprises a body panel and fasteners for connecting the body panel to a plurality of back, side and breast elements of the device, providing coverage along several areas of the pet. The garment is further preferably comprised of a mesh fabric for improved breathability and comfort. While providing a pet covering for a similar purpose, the Ross device employs several disconnected elements for the purpose of coverage over the animal's outer surface area, wherein a plurality of fasteners and disjointed members form a covering thereover. Further, the use of mesh fabric does not align well with the goal of reducing the spread of fine hair and dander, as these elements will naturally make their way through the mesh fabric. The present invention is suited as a temporary cover that is easily deployed, removed and subsequently discarded after use. It is comprised preferably of a singular structure, wherein its paw locations are integral or sewn into a unitary section of material and requires no fastening or diligence by the user to construct the device. The present invention easily fits over most dogs in a particular size category, comes in a form-fitting or loose-fitting variety, and is adapted to be removed and discarded after its use; whereafter a replacement cover may be utilized.

Further, U.S. Pat. No. 7,793,619 to Kajanoff discloses an animal garment having a first and second stretchable leg insert, a substantially non-stretchable back cover and chest halter portion, a first and second coupling arm adapted to connect around the animal's torso, and a stretchable chest insert. The Kajanoff device is adapted to provide a weather covering of particular construction for a domesticated animal, wherein several interconnected panels cooperate to improve thermal insulation while providing stretchable portions thereof for preventing impaired movement while in use. The present invention differs in construction and intent from the Kajanoff disclosure, wherein a single ply sheet of material is utilized to form a hair and dander cover around the pet, wherein the cover is easily removable and thereafter disposable in favor of a replacement covering.

Finally, U.S. Pat. No. 6,223,696 to Murakami describes dog clothing having an arced neck and rear region, a chest and belly covering and locations for independent coverage of each of the dog's legs. A shoulder and waist suspension part are provided that secure the chest and bellow covering in place as the suspension parts connect over the dog's back region. Motions of the dog's shoulder and waist while walking are accounted for as its construction does not hinder movements of the dog's four legs and allows relatively free independent movement thereof without the device hindering normal walking motions. While the Murakami device is suited for coverage of the dog's underbelly and leg regions, it provides only strap-like suspension articles over the dog's back region. This limits its usefulness as a hair and dander guard while in use, and provides a more aesthetic or protective covering while outdoors or for thermal comfort.

The present invention provides a thin barrier material that forms a protective covering over a pet and is adapted to prevent the spread of loose hair and dander. Its construction is one of disposable material and is easily deployed and subsequently replaced after a single use. Its elements substantially diverges in design from the prior art, and consequently it is clear that there is a need in the art for an improvement to existing pet hair covering devices. In this regard the instant invention substantially fulfills these needs.

SUMMARY OF THE INVENTION

In view of the foregoing disadvantages inherent in the known types of pet hair covering devices now present in the prior art, the present invention provides a new disposable covering wherein the same can be utilized for providing convenience for the user when utilizing a single-use covering that prevents the spread of hair and dander from a domesticated pet.

It is therefore an object of the present invention to provide a new and improved pet hair covering device that has all of the advantages of the prior art and none of the disadvantages.

It is another object of the present invention to provide a readily disposable and deployable pet covering that functions as a means to prevent the spread of loosened pet hair and dander within a domicile.

Another object of the present invention is to provide a pet covering that is adapted for single use, wherein its structure and construction allows for ready disposal after application and replacement with a substitute covering.

Yet another object of the present invention is to provide pet covering having two embodiments: a first form-fitting embodiment that does not impair movement while the pet is active, and a second loosely-fitted embodiment that is more adept at providing comfort while stretching and sleeping.

A final object of the present invention is to provide a pet covering comprising of a polypropylene material construction or similarly inexpensive, lightweight and disposable fabric that provides a temporary covering that can be disposed of after a single use.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
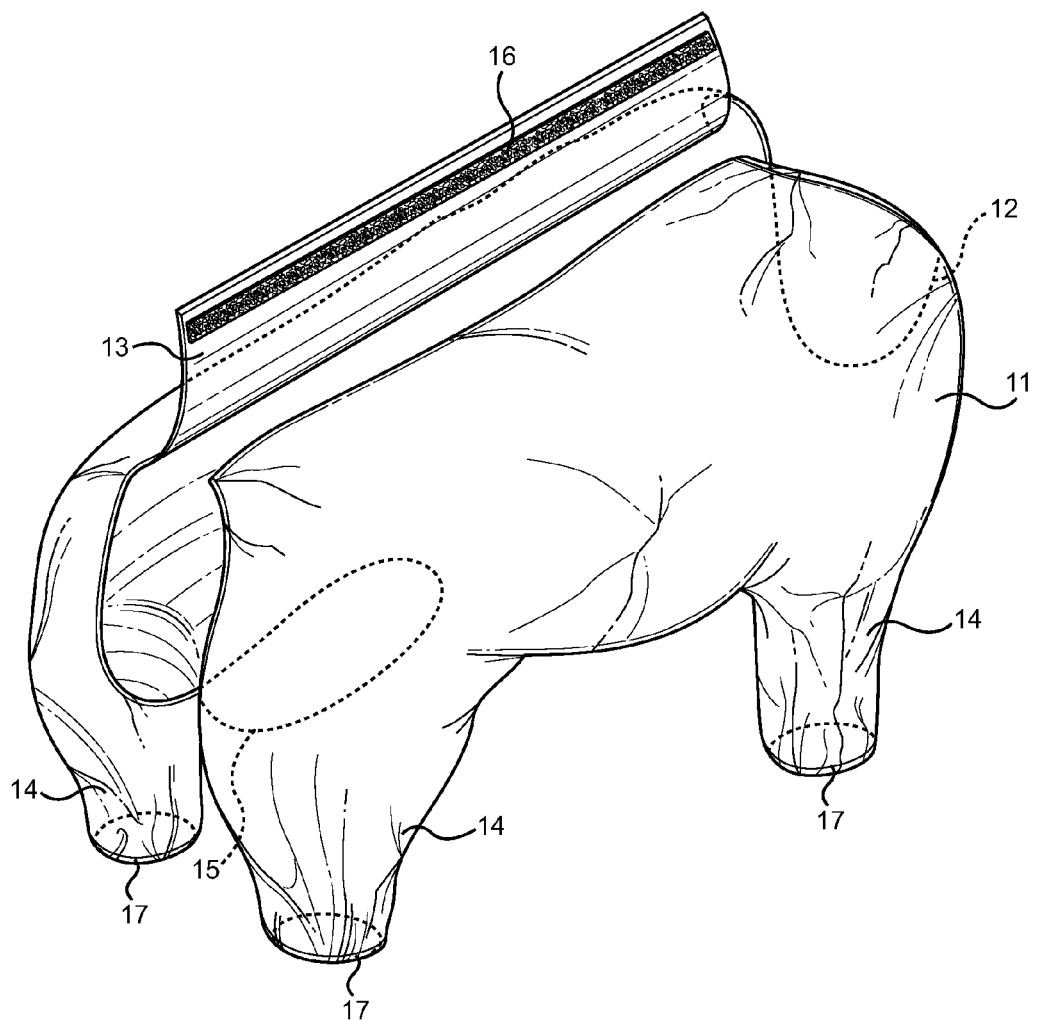
FIG. 1 shows a rear perspective view of an embodiment of the present pet covering in an open configuration.

Reference is made herein to the attached drawings. Like reference numerals are used throughout the drawings to depict like or similar elements of the dog covering device. For the purposes of presenting a brief and clear description of the present invention, the preferred embodiment will be discussed as used for trapping and preventing the spread of pet hair and dander using a disposable, single-use covering. The figures are intended for representative purposes only and should not be considered to be limiting in any respect.

Referring now to FIG. 1, there is shown a rear perspective view of the dog covering device of the present invention in an open configuration and ready for placement over a target pet. The covering comprises a thinly constructed and lightweight structure having minimal stitch lines and independent panels, wherein a lengthwise securing flap 13 is utilized along a majority of the pet's body to allow for ease of entry and removal of the device, despite the anatomical features and size of the given pet. Specifically, the present covering comprises a body portion 11 forming a largely tubular structure in which a plurality of extremity projections 14 are attached or integrally formed therewith. These extensions 14 form coverings along a majority of the pet's limbs, while the body structure 11 is adapted to form a covering over the torso and hind regions of the pet to prevent the spread of loose fur, hair and dander within a household environment. The body structure 11 and limb extensions 14 are preferably formed of a singular sheet of material and cut into a pattern that provides strategic joints wherein a line of stitching forms the overall shape of the covering. Alternatively, the limb portions 14 may be independent panels that are individually sewn or otherwise attached to the body portion in an individual pattern, wherein the body structure 11 is a curved sheet and the limbs are similarly curved sheets that are joined together at the first edge of the limb sheet.

The body structure 11 of the present invention provides several cutouts to allow for the anatomical features of a male or female pet to be accommodated. These include a neck line 12 that forms an open forward section through which the pet's head and neck fitted, along with a rearward hindquarter cutout region 15 that allows the pet's tail, buttocks and genitals to be free of the covering. This allows the pet to relieve itself without the need to remove the covering, if so desired, and further allows the pet's body to be largely covered while allowing the tail and head to project from either end of the covering while deployed. The cutout regions and the upper part of the body portion 11 are separable by a line of connection 16 and closure flap 13 that allows the body portion 11 to be opened widely and to be securely closed around the pet. This facilitates ease of application onto a pet with minimal risk of tearing the covering, and further allows the covering to be securely attached therearound. Along the cutout s and lower edges of each limb projection 14 are elastic bands 17 that secure the edges against the body of the pet while being worn. This keeps the covering from 'riding-up' or becoming loose while on the pet.

Figure 2:
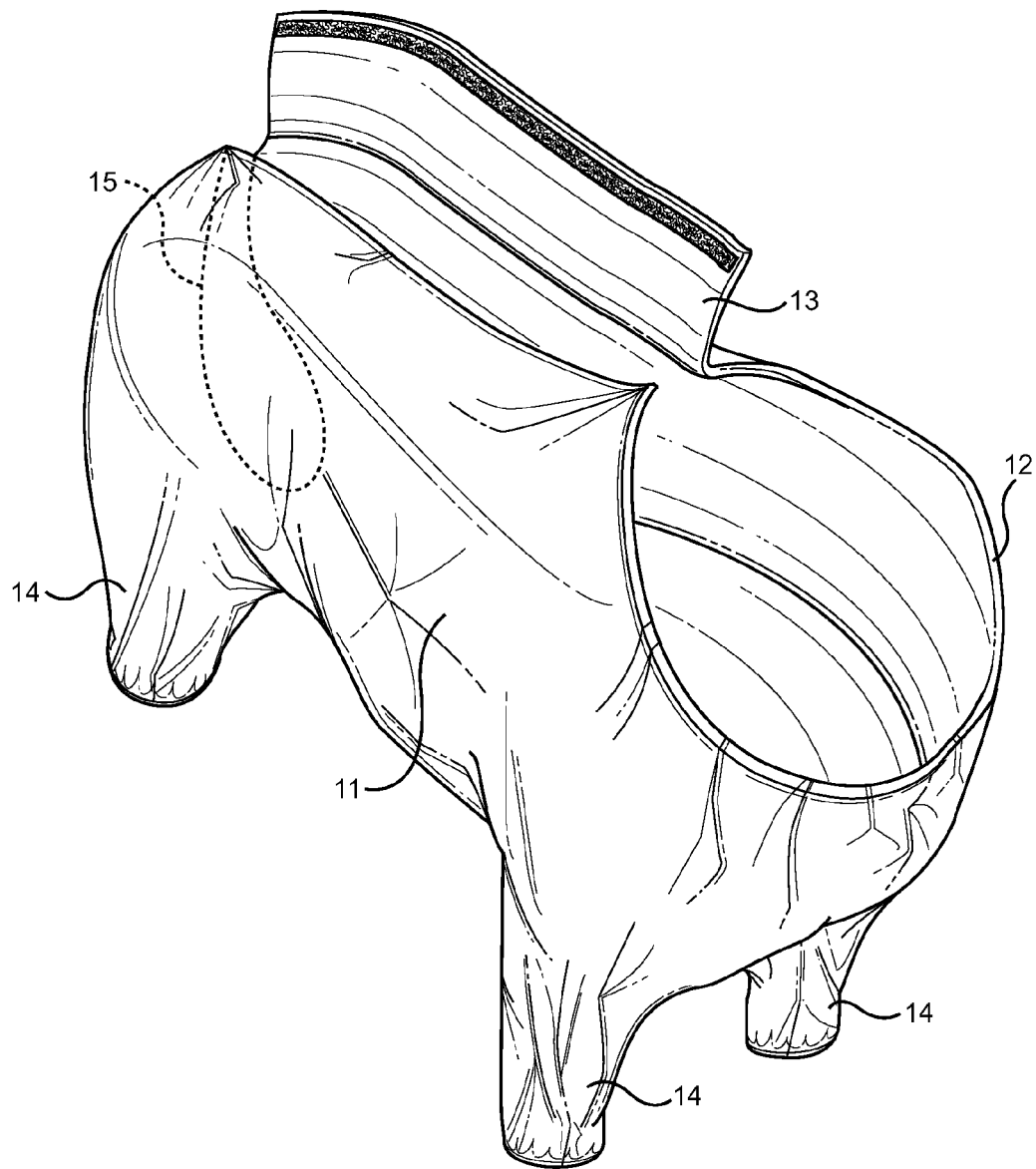
FIG. 2 shows a frontal perspective view of a similarly open configuration.

Referring now to FIG. 2, there is shown an overhead perspective view of the pet covering of the present invention in an open configuration, showing the construction of the covering and its shape. The covering is preferably made of a unitary sheet of readily discardable fabric material such as polypropylene or similarly lightweight, thinly formed fabric that is adapted to form a shell around the pet that can be easily removed without tearing and then condensed and discarded. As shown the body portion 11 is separable along its centerline, wherein a closure flap 13 is provided to secure the covering over and around a given pet. A large neck opening 12 is provided along the forward section and opposing a rearward hindquarter cutout region 15. The body portion 11 connects to a plurality of limb projections 14 to provide an enclosure that can trap a majority of a pet's fur surface area, preventing the hair from transferring to furniture and into the environment while indoors.

Two embodiments of the present invention are contemplated in regards to its size and overall construction. A first embodiment is useful for daytime wear and more active use, wherein the body portion and leg regions are form-fitted within a particular sized covering. The body portion 11 and leg projections 14 are tailored to be closely fitted to the pet's body such that active motion is not impeded and the cover is less prone to being snagged and subsequently torn while being worn. A second embodiment is more suited for overnight and resting periods, wherein a more comfortable size is appropriate. This embodiment employs a more loosely-fitted covering within a size category, providing a baggier configuration that facilitates stretching and prone positioning without the covering interfering with comfort of the pet. The baggy nature of the covering allows for easy repositioning and extended sleeping positions without having to fight against a form-fitting cover that would otherwise inhibit stretched postures. This allows the pet to wear the covering overnight or while resting, which can be useful for those pet owners that allow the pet to lie on their bed or on furniture to sleep. The covering prevents hair and dander from transferring from a majority of the pet's body to the particular furniture item.

Figure 3:
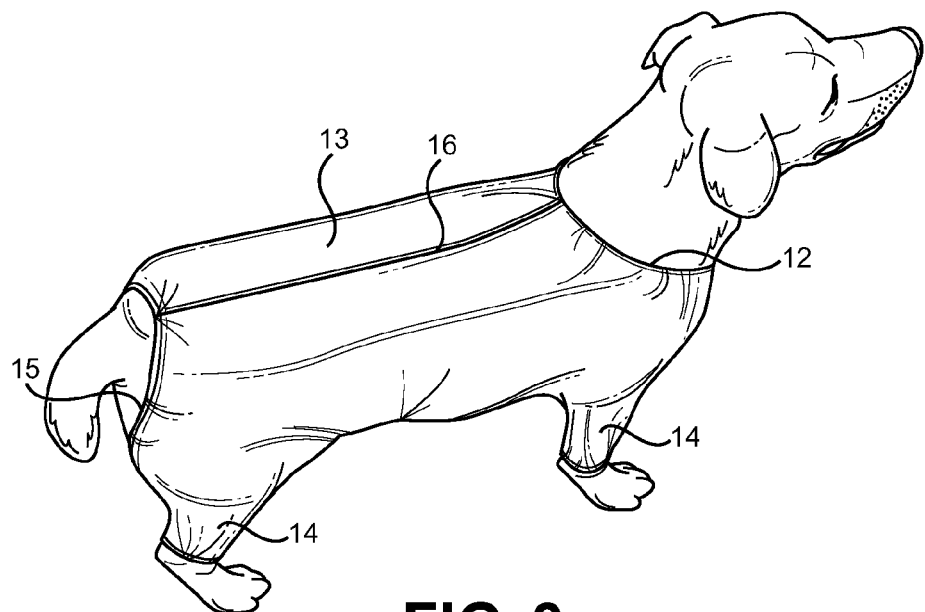
FIG. 3 shows an overhead perspective view of the pet covering in a working position and in use over a dog.
Figure 4:
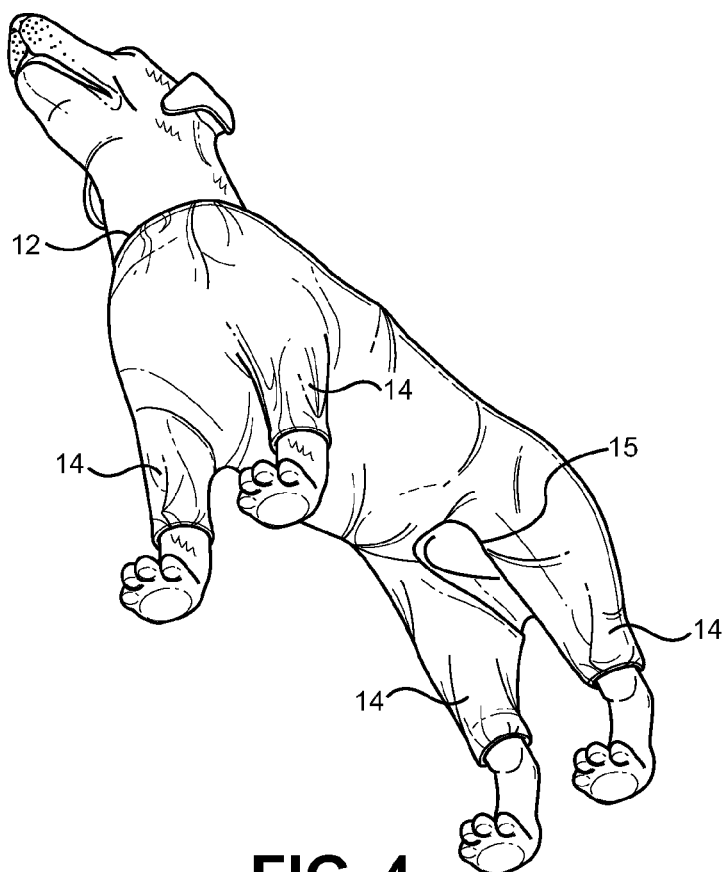
FIG. 4 shows an underside perspective view of the pet covering in a working position and in use over a dog.
Figure 5:
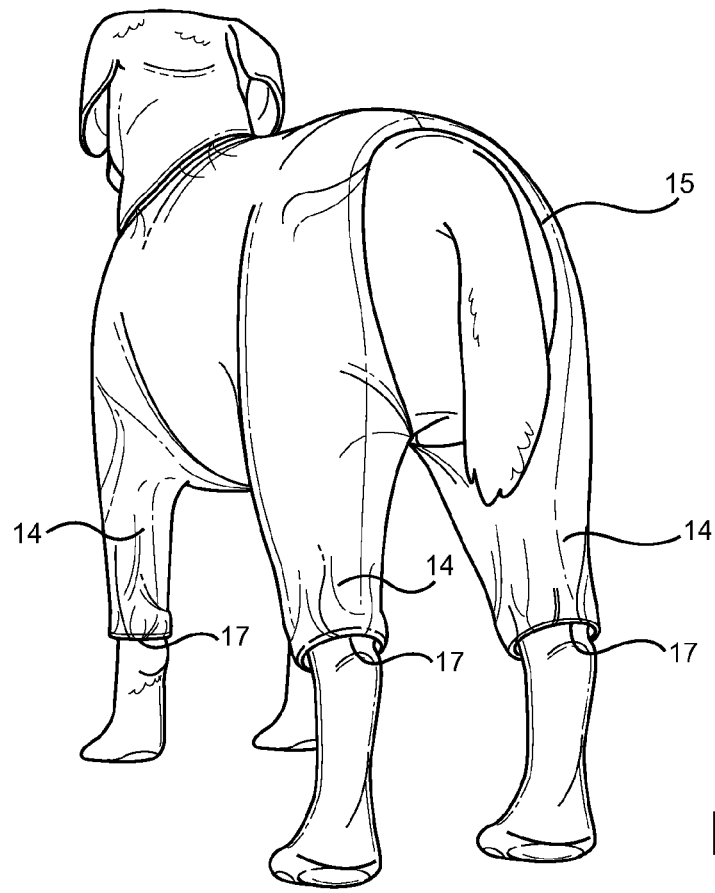
FIG. 5 shows a rear perspective view of the pet covering in a working position and in use over a dog.

Referring now to FIGS. 3 through 5, there are shown perspective views of the present pet covering in a working position and in use over a dog. The tubular body portion of the covering connects to a plurality of limb projections 14 which extend a majority length along each of the pet's legs. The hindquarter cutout 15 and the neck cutout 12 allow the pet to easily don the device, while its line of connection 16 opens in a flap 13 configuration to open the entire body portion and allow the pet to easily enter and wear the device. During use and as the dog moves, fur, hair and dander are trapped within the interior of the covering and prevented from transferring onto a piece of furniture of elsewhere within a household environment. The construction of the material allows the covering to be easily discarded and replaced by a substitute covering, wherein the first covering is discarded with a collection of loose fur and dander from the pet after a given wearing period.

Figure 6:
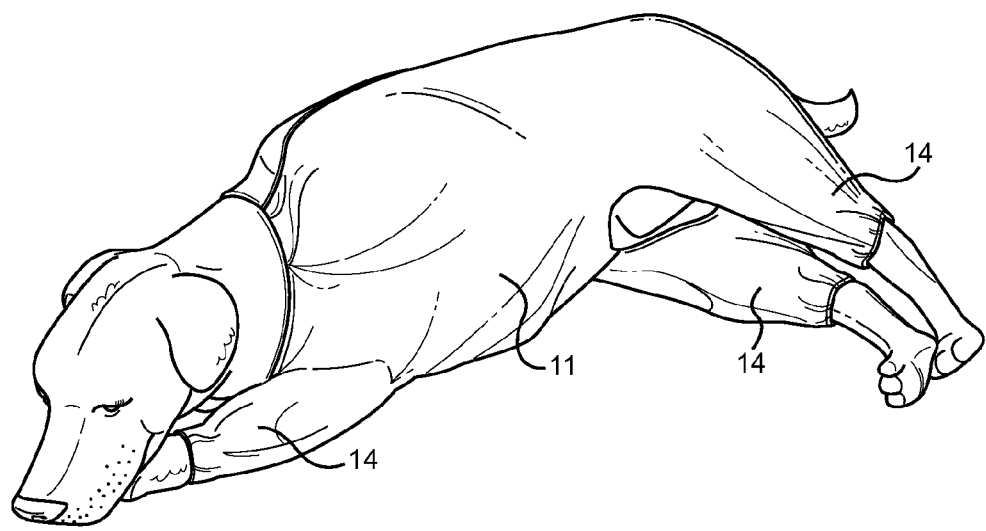
FIG. 6 shows a perspective view of an embodiment of the present covering wherein a loosely-fitted embodiment is deployed.

Referring now to FIG. 6, there is shown an embodiment of the present invention wherein a loose-fitting configuration is deployed, allowing the pet to easily sleep, stretch and rest within the covering and without restrictions to its positioning. The loosely-fitted embodiment does not ride or restrict movement, which facilitates comfort while prone or in an otherwise relaxed position. Once the animal has worn the covering for a period of time, it can be removed for a different style or fresh replacement, while the used covering is discarded along with any trapped hair, dander or fur.

Overall the present invention provides a disposable garment for a pet that prevents the animal from shedding fur in the house or in the car. The covering ensures that animal hair does not attach to furniture, carpets, clothing, or vehicle upholstery. The garment is available in a form-fitting or looser fitting variation for different preferences or intended uses. The covering material is adapted to be readily disposable and provide a single-use product, while its construction is soft and comfortable to allow the pet to perform its regular activities without interference.

Many pet owners hesitate allowing their dog to sleep in their bed or rest on furniture because they do not want to consistently clean and freshen these items after pet hair has been left behind. This is also true when taking a dog for a ride in the car. It can be difficult to vacuum pet hair that has been left on the vehicle upholstery. Pet owners often become frustrated trying to remove pet hair that has become imbedded in carpets and on furniture, and since it is a common and difficult problem to prevent a pet from shedding, the present invention is provided as a fur-trapping covering that is readily deployable, replaceable and disposable, and further provides an alternative to traditional pet coverings that are adapted to provide thermal insulation or improved outward styling.

The present invention is a covering for pets that keeps the animal from shedding hair onto furniture, upholstery, carpets, and floors. The invention is comprised of a garment available in two primary embodiments and being adapted for single use, wherein a first covering may be replaced by a second and a plurality thereof may be provided in a single package for sale. The desired construction includes minimal stitch lines and continuous portions of fabric to form the tubular body portion and leg projections that form the pet covering structure. The open flap along the upper portion of the covering provides for ease of entry, while a line of hook and loop fasteners along the edge of the flap provides a means of securement. There is a cutout for the tail and another cutout under the belly to allow the pet to relieve himself as normal. Further, there are openings to receive the pet's front and back paws. At the base edge of each limb projection are preferably elastic gatherings that form a secure seal around the pet's limbs to prevent hair from exiting and to keep the covering in place during activity. Each suit is made from a disposable, lightweight material, such as polypropylene to facilitate its one-time use and ease of replacement.

In light of the given disclosure and the relevant prior art devices, it is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A disposable, loose-fitting, fur-trapping pet covering, consisting of:
   a monolithic sheet forming a tubular section adapted to cover a pet's torso and hindquarter region, said tubular section further comprising a lengthwise opening extending from an area disposed below a pet's neck along a pet's spinal region and down said pet's hindquarter region and onto a portion of a pet's stomach;
   a closure flap extending along one side of said lengthwise opening, wherein said flap, when in a closed position, covers said pet's spine and terminates along said pet's spinal region before a pet's tail, said closure flap defining a hindquarter opening for said pet's tail and genital region, and a neck opening when in said closed position;
   said hindquarter opening has a first peripheral edge;
   said neck opening has a second peripheral edge;
   said monolithic sheet further consisting of a plurality of limb projections extending from said tubular section and adapted to cover along a pet's limbs from said hindquarter region to a pet's knees or elbows;
   wherein said hindquarter opening employs an elastic cuff along said first peripheral edge;
   said lengthwise opening allowing a pet to enter said covering and said closure flap securing said covering over said pet after being donned;
   said tubular section and said plurality of limb projections being constructed of a lightweight, disposable material adapted for one-time use and then discarded once removed from said pet.

2. The device of claim 1, wherein said plurality of limb projections terminate at an elastic cuff.

3. The device of claim 1, wherein said neck opening employs an elastic cuff along said second peripheral edge.

\* \* \* \* \*